(12) United States Patent
Camp

(10) Patent No.: US 6,252,543 B1
(45) Date of Patent: Jun. 26, 2001

(54) LOCATION SYSTEM COMBINING RANGING MEASUREMENTS FROM GPS AND CELLULAR NETWORKS

(75) Inventor: William O. Camp, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/315,002

(22) Filed: May 19, 1999

Related U.S. Application Data

(60) Provisional application No. 60/087,207, filed on May 28, 1998.

(51) Int. Cl.[7] ................ G01S 5/02; H04B 7/185
(52) U.S. Cl. ................ 342/357.06; 342/357.01; 342/450; 342/463; 701/213; 455/422; 455/426; 455/427; 455/456; 455/457; 327/291
(58) Field of Search .................. 342/357.01–357.17, 342/450–465; 455/403, 422, 426, 427, 432, 433, 456, 457; 380/247–250, 255, 270–273, 31–34, 274; 701/200, 207, 213–216; 331/46–56; 327/291, 293, 298; 377/106

(56) References Cited

U.S. PATENT DOCUMENTS 5,982,324 * 11/1999 Watters et al. .................. 342/357.06
6,081,229 * 6/2000 Soliman et al. ................ 342/357.05

* cited by examiner

Primary Examiner—Bernarr E. Gregory
(74) Attorney, Agent, or Firm—Jenkens & Gilchrist, P.C.

(57) ABSTRACT

Methods and arrangements are provided for locating a mobile terminal within a mobile telecommunications system. In certain embodiments, GPS ranging signals and cellular base station transmitted downlink signals are received by a mobile terminal, which is configured to determine its current location using a combination of these two types of ranging signals. In certain other embodiments, GPS ranging signals are received by the mobile terminal, which is also configured to transmit uplink signals to cellular base stations. The current location of the mobile station is determined by fusing measured data from each of these different ranging signal transmissions. By combining the available resources of satellite and terrestrial locating processes, the potential for locating a mobile terminal is significantly increased.

26 Claims, 6 Drawing Sheets

LOCATION SYSTEM COMBINING RANGING MEASUREMENTS FROM GPS AND CELLULAR NETWORKS

RELATED APPLICATION

Under Title 35 United States Code §119(e), this application claims the benefit of the filing data of U.S. Provisional Application No. 60/087,207, filed May 28, 1998.

TECHNICAL FIELD OF THE INVENTION

The present invention relates to mobile telecommunication systems, and more particularly to methods and arrangements for locating mobile terminals.

BACKGROUND

It is desirable, and in certain places mandated by law, that mobile telecommunication network providers be able to determine an approximate geographical location of a mobile terminal (MT), such as, for example, an actively communicating cellular telephone.

There are a variety of MT location techniques currently being tested or used. These location techniques can be grouped into three basic categories.

The first basic category includes "uplink signal" location techniques, wherein the mobile telecommunications network is configured to determine where the MT is located based on ranging measurements associated with one or more uplink signals, which are transmitted by the MT and received by a requisite number of receivers having known locations, such as, for example, cellular telephone base stations (BSs).

The second basic category includes "downlink signal" location techniques, wherein the mobile telecommunications network is configured to determine where the MT is located based on ranging measurements associated with the reception, by the MT, of downlink signals from a requisite number of transmitters having known locations.

The third basic category includes using location services not associated with either the uplink or downlink signals used in the mobile telecommunications network. One example, of such a location service is the Global Positioning System (GPS) in which GPS receivers collect and analyze ranging measurements from signals transmitted by GPS satellites having known locations. Currently, there are twenty-four (24) GPS satellites in orbit.

The location techniques in each of these three basic categories include collecting ranging measurements such as, for example, a time of arrival (TOA), a time difference of arrival (TDOA), an observed time difference (OTD), or the like. These ranging measurements are gathered by detecting one or more measurement features within the transmitted/received signal(s). Each of the various location techniques has certain limitations or drawbacks that can significantly reduce their accuracy.

By way of example, currently available or proposed TOA, TDOA, and OTD location techniques that utilize existing BSs typically require that at least three (3) or more BSs receive the transmitted uplink signal from the MT, or conversely that the MT receive transmitted downlink signals from at least three BSs to perform the locating process. Similarly, with respect to the GPS, a GPS receiver needs to receive transmitted signals from at least four (4) GPS satellites to perform the locating process.

Unfortunately, at certain times there is not always a clear line-of-sight (LOS) between the requisite transmitter(s) and receiver(s). For example, in an urban environment, the LOS is often blocked by building and/or other structures, while in certain other environments the naturally occurring terrain and/or other features (e.g., mountains, canyons, forests, weather, etc.) can reduce the LOS, attenuate the transmitted signals, or produce multipath signals at the receiver. For many higher frequency signals or weaker signals, the loss of LOS or the introduction of such obstacles, can render the location technique significantly inaccurate, or completely unavailable.

Consequently, there is a need for methods and arrangements that provide location techniques having improved accuracy, reliability, and/or accessibility.

SUMMARY

In accordance with certain aspects of the present invention, methods and arrangements are provided for locating a mobile terminal. The methods and arrangements combine terrestrial-based location techniques with satellite-based location techniques, resulting in improved accuracy, reliability, and accessibility. For example, considering the three basic categories identified in the Background section, above, the present invention provides various methods and arrangements for combining at least portions of the location techniques in the first and/or second categories with the location techniques in the third category.

Thus, for example, the above stated needs and others are met by a mobile terminal locating method, in accordance with certain embodiments of the present invention. The method includes receiving a signal from at least one satellite, and a signal from at least one terrestrial transmitter, using the mobile terminal. The method further includes measuring a "time of flight" for each of the received signals and converting each of the resulting time of flight measurements to corresponding range values. The range values are then used by the mobile station to determine its approximate position. In certain embodiments, the satellite is part of the Global Positioning System (GPS) and the terrestrial transmitter is a base station within a mobile telecommunications system. In still other embodiments the method also includes using a single time measuring unit, located within the mobile terminal, to measure the respective time of flights for both the first type of signals and the second type of signals.

In accordance with further embodiments of the present invention, an arrangement for use in a mobile terminal and a mobile telecommunications system is also provided. Each of these embodiments, includes at least one time measuring unit that is configured to receive a signal associated with at least one satellite and a signal associated with at least one terrestrial transmitter. The time measuring unit is further configured to measure a time of flight for each of the received signals, convert each of the resulting time of flight measurements to corresponding range values, and determine and output an approximate position of the mobile terminal using the range values.

In accordance with still further embodiments of the present invention, another method for locating a mobile terminal is provided. This method also meets the above stated needs and others and includes receiving a plurality of first type signals from a plurality of satellites, and transmitting at least one second type of signal to a plurality of base stations, using the mobile terminal. The method further includes measuring a time of flight for each of the first type of signals received at the mobile terminal and measuring a time of flight for each of the second type of signals received at the plurality of base stations. Additionally, the method includes converting each of the resulting time of flight measurements to range values, and determining an approximate position of the mobile terminal using the range values. In certain further embodiments, the satellite is part of a Global Positioning System (GPS). This method can be used with only two satellite signals and two base stations by synchronizing clocks within at least each of the two satellites and at least each of the two base stations. This method can also be used if there are signals from at least two satellites and at least three base stations receive the second type of signal from the mobile station, or conversely, if there are signals from at least three satellites and at least two base stations receive the second type of signal from the mobile station.

An arrangement for use with a mobile telecommunications system in locating a mobile terminal is also provided, in accordance with certain further embodiments of the present invention. The arrangement includes a satellite location system, such as, for example, GPS, having a plurality satellites configured to output a plurality of first type signals. A plurality of base stations and at least one location determining node are provided within the mobile telecommunications system. The arrangement further includes a mobile station that is in radio communication with at least one of the plurality of base stations and configured to transmit at least one second type of signal to at least one of the plurality of base stations, and receive the plurality of first type signals from the plurality of satellites. Here, the mobile station measures a time of flight for each of the first type of signals and provides a range value for each of the first type of signals received to the location determining node. The plurality of base stations are configured to receive the second type of signal from the mobile terminal, measure a time of flight for each of the second type of signals and communicate a range value for each of the second type of signals received to the location determining node. The location determining node is then able to determine an approximate position of the mobile terminal various range values.

In accordance with still further embodiments of the present invention, a shared clock arrangement is provided. In certain embodiments this shared clock arrangement is advantageously used to relate two (2) different clock signals, such as, for example, a local mobile terminal or base station clock signal and a GPS clock signal. The shared clock arrangement includes a correlator, which correlates a first clock signal with a second clock signal and outputs a correlated clock signal. The arrangement also includes a frame generator that receives the first clock signal and outputs a corresponding generated frame signal. The correlated clock signal and the generated frame signal are then provided to a comparator, which measures the algebraic sum of the two signals and outputs a corresponding summed output clock signal.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

A. Introduction

Figure 1:
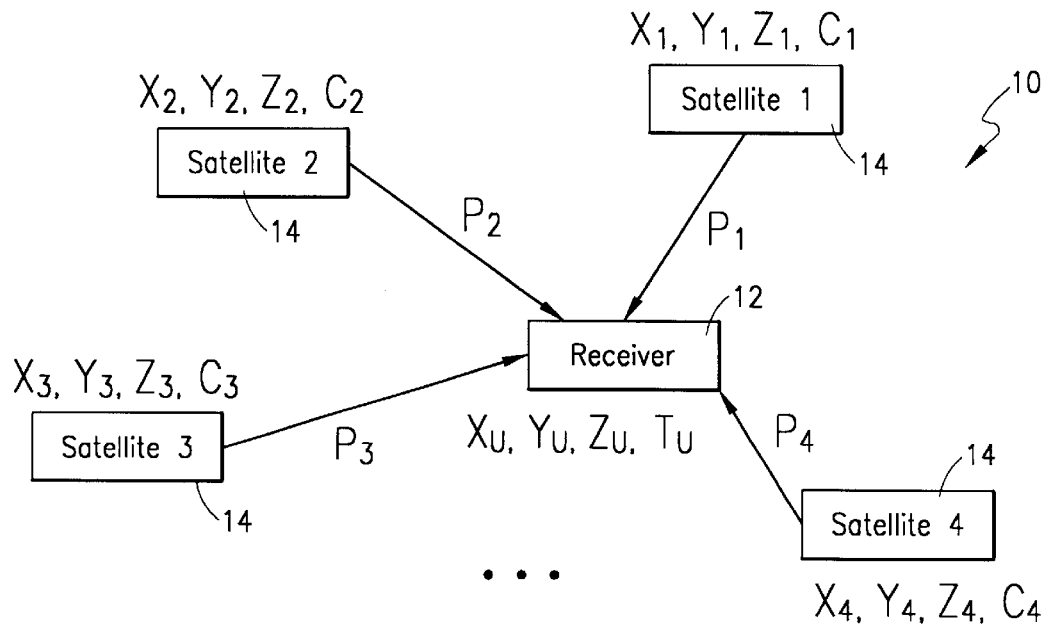
FIG. 1 is a block diagram depicting a satellite-based mobile receiver location system, such as, for example, the Global Positioning System (GPS) provided by the U.S. Department of Defense.

In accordance with certain aspects of the present invention, a mobile terminal (MT), such as, for example, an actively communicating cellular telephone, is located by combining conventional location technologies associated with mobile telecommunication network systems and the Global Positioning System (GPS).

Each of these discrete systems employs location techniques having certain characteristics in common. For example, each of these systems require the collection of a requisite number of ranging measurements from signals passed between transmitter(s) and receiver(s), wherein either the transmitter(s) or the receiver(s) have known or determinable locations (i.e., positions).

Further, each of the collected ranging measurements can be converted from a time interval measurement to a corresponding distance measurement, for example, by multiplying by the speed of light or an expected speed of transmission associated with the signal. Once the conversion from time to distance has been accomplished, then traditional triangulation, or other like mathematical techniques can be used to determine the positional coordinates of the MT, based on the known locations and calculated distances.

In the case of a time of arrival (TOA) location technique, for example, the positions of the base stations (BSs) are known and do not change over time. The ranging measurements can occur in a variety of ways, including: 1) having each BS measure the TOA of a synchronized word (synch word), as broadcast repeatedly in an uplink signal from the MT; 2) having each BS measure the timing advance required for communication with the terminal; and/or 3) having the MT separately measure a TOA based on a synch word in the transmitted downlink signal from each of the BSs. Assuming that the MT is positioned within a relatively planar environment, distance information from three (3) BSs is required to solve for x and y positional coordinates on the ground and the unknown time of broadcast of the synch word (either uplinked or downlinked).

In the case of the GPS location technique, the positions of the GPS satellites vary with regard to time. Thus, a GPS receiver needs to receive an accurate measurement of time from the GPS satellites (or an accurate GPS-related source on the ground) in order to know the positions of the GPS satellites at the time of the ranging measurements. The ranging measurements between the GPS receiver and each of at least four (4) GPS satellites occurs by: 1) finding the starting point on the 1023 chip long Gold code sequence within the signal transmitted by each GPS satellite; 2) finding the start time of a bit edge; and 3) finding the start time of the data message. The resulting "time of flight" for the signal received from each GPS satellite is then converted to distance. The resulting four (4) range measurements allow for a solution to the GPS receiver's position in x, y and z coordinates and for determination of the unknown time difference between the GPS time and the GPS receiver's independent clock.

Thus, in the examples above, the underlying location process for both the mobile telecommunication network and the GPS essentially rely upon receiving signals from certain known positions, and gathering ranging measurements from a sufficient number of signals to solve for the MT's location.

These common characteristics and others will be described in more detail below to show how the present invention advantageously combines location techniques and/or locating processes by providing mathematical solutions that can be processed to solve for the positional coordinates of the MT.

In accordance with certain aspects of the present invention, the signal sources can include any viable combination of terrestrial-based transmitters, and space-based transmitters having static and/or dynamic positions with respect to time.

Those skilled in the art will further recognize that the methods and arrangements in accordance with the present invention can, therefore, be adapted for use with a variety of different types of mobile terminals, other system's transmitters, and/or special purpose transmitters. For convenience, however, the exemplary embodiments described herein are directed towards combining certain aspects of a conventional mobile telecommunications network (e.g., a cellular network) and the existing GPS.

With this in mind, certain features associated with the various methods and arrangements in accordance with the present invention will now be described with particular references to existing systems and certain exemplary mathematical equations.

GPS Location System Examples

FIG. 1 is a block diagram depicting a conventional satellite-based location system 10, such as, for example, the GPS, which includes a receiver 12 and a constellation of at least four (4) satellites 14, from which distances to receiver 12 are determined by receiver 12 upon acquiring and interpreting the signals from each. These determined distances, are often referred to as "pseudoranges" because they represent ranges to the satellites with an inherent error caused by the use of a local clock within receiver 12 that is not "synchronized" to GPS time. Nevertheless, based on the positions of the satellites at the time of the measurements, one can produce a solution for the x, y and z coordinates of receiver 12, as well as the time shift or difference between the local clock within receiver 12 and GPS time.

To determine the location of receiver 12 in three dimensions, receiver 12 needs to make ranging measurements to at least four (4) satellites 14. For a GPS receiver this is typically not a problem, since the current GPS constellation of twenty-four (24) satellites provides coverage for about 99% of the Earth's surface. Of course, receiver 12, preferably needs to have a significantly clear line-of-sight (LOS) to the sky to provide optimal performance.

As depicted in FIG. 1, the listed coordinates for receiver 12 and each satellite 14 are expressed in an Earth Centered Earth Fixed reference system. Thus, $X_i$, $Y_i$, and $Z_i$ represent, respectively, the known positional coordinates of each ($i^{th}$) satellite 14. $C_i$ represents the time correction for each ($i^{th}$) satellite 14 relative to GPS time. $X_U$, $Y_U$, and $Z_U$ represent the unknown coordinates of receiver 12. $T_U$ represents the time difference between GPS time and internal terminal clock time of receiver 12. Finally, $P_i$ represents the measured code phase of the signal from each ($i^{th}$) satellite 14.

In accordance with certain embodiments of the present invention, GPS location techniques can be simplified somewhat when applied to a cellular phone system. For example, an advantage can be gained through the reasonable assumption that the unknown position of receiver 12 (e.g., a cellular phone having a GPS receiver) to be operating (i.e., communicating with a BS) will be within about 300 km or less of a known location (i.e., the location of the BS). Therefore, by taking the measured code phase of each GPS signal and adding an appropriate number of milliseconds, for example, to each measurement representing the nearest, rounded down integer millisecond ($N_i$) signal propagation time from each ($i^{th}$) satellite 14 to the approximate location of receiver 12, the pseudoranges $PR_i$ for each ($i^{th}$) satellite 14 can be obtained by:

$$PR_i = (P_i + N_i + C_i)/c \qquad (1)$$

Wherein, c represents the speed of light, preferably corrected for propagation effects By measuring the code phase of each signal receiver 12 is essentially finding the start of the Gold Code sequence (1023 bits long) for that satellite 14 relative to an internal clock within receiver 12. This measurement, preferably, needs to be done to an accuracy of about a few nanoseconds to maintain an overall accuracy of feet in the location method. It does not matter that the internal clock is not synchronized to the GPS clock because that error is solved for by using four (4) rather than three (3) satellite ranging measurements. Thus, there are four (4) equations and four (4) unknowns:

$$PR_i = ((X_i - X_U)^2 + (Y_i - Y_U)^2 + (Z_i - Z_U)^2)^{1/2} + cT_U \quad (2)$$

Those skilled in the art will recognize that this set of problems can be solved in several different ways. One way is to presume that receiver 12 is at the approximate known location, (as is done herein for certain exemplary embodiments of the combined GPS/cellular phone network locating process), and then to calculate the differences between the measured pseudoranges, $PR_i$, and the calculated pseudoranges, $PR_i'$, to that location. Thus, multiplying the vector of such pseudorange "differences" by the inversion of the coefficients of the 4 by 4 matrix formed by the direction vectors to the satellites 14, yields a delta X, Y, Z and T, which are added to the initial assumed location and time error (0) to obtain the correct values for those variables. In this case, $X_U'$, $Y_U'$, $Z_U'$ are the values for the approximate known location of receiver 12. $R_i'$ is the distance to each ($i^{th}$) satellite 14 from the approximate known location of receiver 12. We leave $PR_i'$ as a pseudorange in the following and not as $R_i'$, because one often leaves out the $N_i$ in $PR_i'$ in this calculation without a substantial impact. This is shown in the following equations:

$$\begin{pmatrix} PR_1 - PR_1' \\ PR_2 - PR_2' \\ PR_3 - PR_3' \\ PR_4 - PR_4' \end{pmatrix} = \quad (3)$$

$$\begin{pmatrix} (X_1 - X_U')/R_1' & (Y_1 - Y_U')/R_1' & (Z_1 - Z_U')/R_1' & 1 \\ (X_2 - X_U')/R_2' & (Y_2 - Y_U')/R_2' & (Z_2 - Z_U')/R_2' & 1 \\ (X_3 - X_U')/R_3' & (Y_3 - Y_U')/R_3' & (Z_3 - Z_U')/R_3' & 1 \\ (X_4 - X_U')/R_4' & (Y_4 - Y_U')/R_4' & (Z_4 - Z_U')/R_4' & 1 \end{pmatrix} \times \begin{pmatrix} X_U - X_U' \\ Y_U - Y_U' \\ Z_U - Z_U' \\ cT_U \end{pmatrix}$$

Which can be defined as:

$$dPR = H \times dX \quad (4)$$

With an inverted H matrix providing:

$$dX = H^{-1} \times dPR \quad (5)$$

This equation (5) is iteratively or recursively calculated until the solution converges for $X_U$, $Y_U$, and $Z_U$ and the time ambiguity.

C. Uplink TOA Location System Examples

Figure 2:
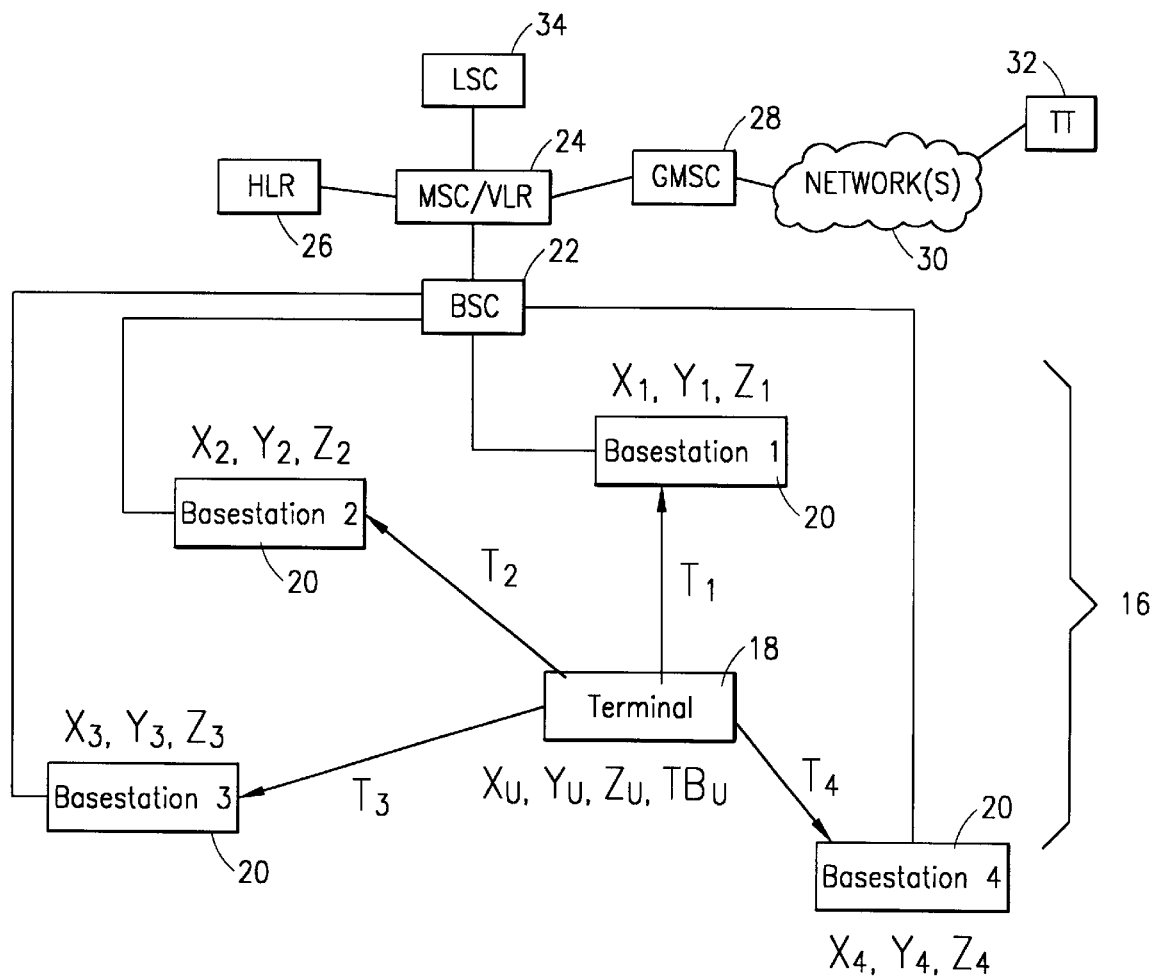
FIG. 2 is a block diagram depicting an exemplary portion of a mobile telecommunications system having an uplink time-of arrival (TOA) mobile terminal (MT)location system.

Reference is now made, to FIG. 2, which is a block diagram of an exemplary mobile telecommunications system 16 that is configured to perform a conventional uplink TOA location technique based on ranging measurements associated with at least one uplink signal from a MT 18 and received by at least four (4) or more BSs 20.

BSs 20 are part of a mobile telecommunications network, wherein, for example, each BS 20 is connected to at least one base controller station (BTS) 22, which is further connected to at least one combined Mobile Switching Center/Visitor Location Register (MSC/VLR) 24. MSC/VLR 24 is further connected to a Home Location Register (HLR) 26 and a Gateway Mobile Switching Center (GMSC) 28. GMSC 28 provides connectivity to at least one further communications network 30 through which calls can be connected between MT 18 and at least one telecommunications terminal (TT) 32. A location service controller (LSC) 34 is provided to request and/or otherwise control/configure MT 18 and BSs 20 to conduct a MT locating process. Such arrangements, and similar arrangements for system 16 are well known.

A typical cellular phone signal, for example, provides many opportunities for conducting ranging measurements. The ranging measurements are usually based on one or more identifiable or unique features in the signal(s) that are uplink transmitted by MT 18 to BSs 20. Examples of unique features include a frame synch word, or the bit synch pattern used to train a receiver equalizer. Regardless of the type of unique feature employed, it is determined ahead of time or otherwise established, for example, by LSC 34, that a particular unique feature is the common point to measure TOA at the various BSs, 20.

As is further known, such MT locating processes can be enhanced in several ways to reduce errors, such as averaging multiple measurements or measuring the first peak in the signal such as would be done to minimize multipath errors. Because the BS towers, etc., will be on the Earth's surface, there is little opportunity to determine the altitude of MT 18. This means that system 16 can use a minimum of three (3) BSs 20 to determine the positional coordinates of MT 18, and the timing difference between MT 18 and BSs 20 (assuming that the clocks in BSs 20 are synchronized).

However, for the purpose of the mathematical problems that follow in this description, it will be assumed that four (4) BSs 20 are used, as shown in FIG. 2. Here, $X_i$, $Y_i$, and $Z_i$ represent the known positional coordinates of each ($i^{th}$) BS 20. $X_U$, $Y_U$, and $Z_U$ represent the unknown positional coordinates of MT 18. TBu represents the time difference between BS (cellular) time and MT clock time. $T_i$ represents the measured time of the unique feature of the signal(s) from MT 18.

One way to use GPS with a cellular phone system is to presume that the individual BSs 20 include a GPS receiver, and/or are otherwise capable of obtaining GPS time with which to measure the TOA, $T_i$, of the unique feature in the signal(s) from MT 18. In such a situation, therefore, $TB_U$ can become $T_U$ with proper synchronization between the two sets of measurements. As such the ($i^{th}$) pseudorange can be determined as the observed time divided by the speed of light, as we do not know $TB_U$ when the signal feature was sent. Thus, $$PR_i = T_i/c \quad (6)$$

As before with system 10 in FIG. 1, this pseudorange is equal to the real range corrected for the unknown time:

$$PR_i = ((X_i - X_U)^2 + (Y_i - Y_U)^2 + (Z_i - Z_U)^2)^{1/2} + cTB_U \quad (7)$$

This leads to similar mathematical equations as shown above in equations (3), (4) and (5), which can be, for example, iteratively processed until a solution converges.

It should be noted however, that the distances between BSs 20 and MT 18 are so much shorter than the distances between receiver 12 and satellites 14 (in FIG. 1) that the H matrix will not be unchanged for moderate errors in the presumed approximate location versus real location. This means that more iterations of the solution will have to be performed to converge on the correct location solution.

D. Combined GPS And Uplink TOA Location System Examples

Figure 3:
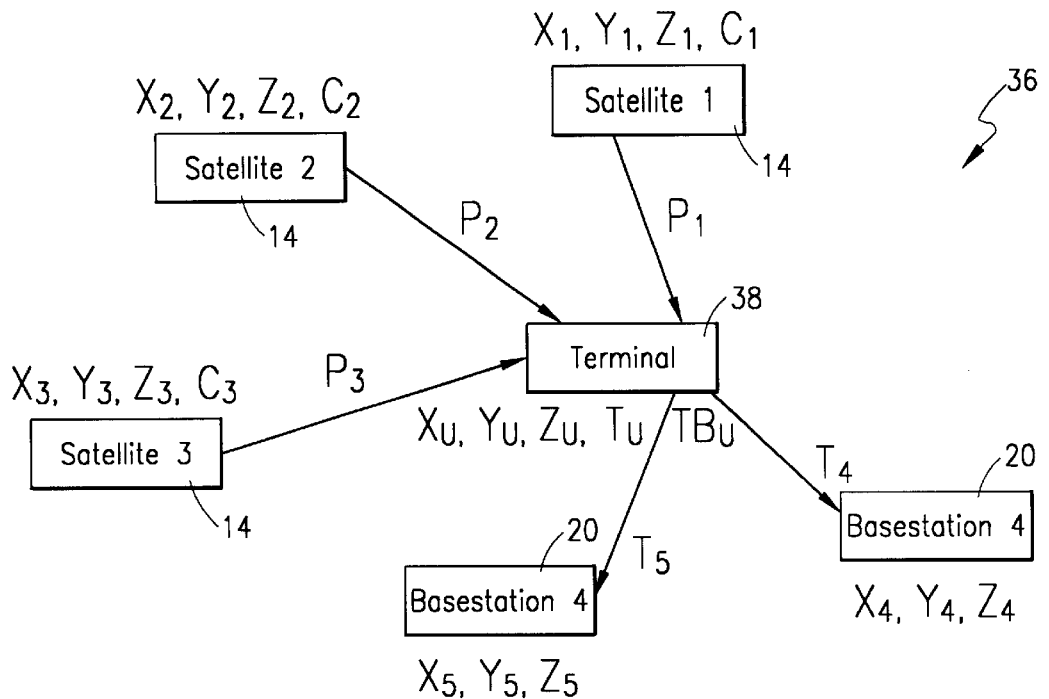
FIG. 3 is a block diagram depicting an exemplary combined GPS and uplink TOA MT location system for use in a mobile telecommunications system, for example, as in FIG. 2, in accordance with certain embodiments of the present invention.

Reference is now made to FIG. 3 which is a block diagram depicting an exemplary combined GPS and cellular network location system 36, in accordance with certain embodiments of the present invention. Combined location system 36 can be configured, e.g., as in FIG. 2, to provide standard connectivity to TT 32, and to be operatively coupled with LSC 34 to support a MT locating process.

The combined location system 36, as shown in FIG. 3 and described herein, can further be configured to switchable and/or selectively operate, with respect to locating processes. Thus, combined location system 36 can be configured as a combined satellite/terrestrial signal based locating system, a purely terrestrial signal based locating system, or as a purely satellite signal based locating system.

For example, MT 38 within combined location system 36 can essentially act as either a modified GPS receiver 12 (i.e., one that provides communication capabilities) or MT 18 (see FIG. 2), depending upon user selection, commands from LSC 34 or other network resources, and/or based upon the availability, quality and/or quantity of satellite signals and terrestrial signals.

As shown, combined location system 36 includes MT 38, and a plurality of satellites 14 and BSs 20. In this example, combined location system 36, essentially combines GPS locating techniques with uplink TOA locating techniques. This requires that data from the GPS locating process be fused with data from the uplink TOA locating process.

In a first example, it will be assumed that the two time uncertainties, $T_U$ and $TB_U$, are not linked (e.g., the cellular BSs 20 are not synchronized to GPS time). Thus, for the satellite measurements, the pseudoranges are:

$$PR_i = (P_i + N_i + C_i)/c \quad (8)$$

For the (terrestrial )uplink TOA measurements, the pseudoranges, assuming that the BSs are synchronized, are:

$$PR_i = T_i/c \quad (9)$$

Such that the equivalent of equation (3) (i.e., the GPS example) now looks like:

$$\begin{pmatrix} PR_1 - PR'_1 \\ PR_2 - PR'_2 \\ PR_3 - PR'_3 \\ PR_4 - PR'_4 \\ PR_5 - PR'_5 \end{pmatrix} = \quad (8)$$

$$\begin{pmatrix} (X_1 - X'_U)/R'_1 & (Y_1 - Y'_U)/R'_1 & (Z_1 - Z'_U)/R'_1 & 1 & 0 \\ (X_2 - X'_U)/R'_2 & (Y_2 - Y'_U)/R'_2 & (Z_2 - Z'_U)/R'_2 & 1 & 0 \\ (X_3 - X'_U)/R'_3 & (Y_3 - Y'_U)/R'_3 & (Z_3 - Z'_U)/R'_3 & 1 & 0 \\ (X_4 - X'_U)/R'_4 & (Y_4 - Y'_U)/R'_4 & (Z_4 - Z'_U)/R'_4 & 0 & 1 \\ (X_5 - X'_U)/R'_4 & (Y_5 - Y'_U)/R'_4 & (Z_5 - Z'_U)/R'_5 & 0 & 1 \end{pmatrix} \times$$

$$\begin{pmatrix} X_U - X'_U \\ Y_U - Y'_U \\ Z_U - Z'_U \\ cT_U \\ cTB_U \end{pmatrix}$$

Wherein the fourth column of the H matrix identifies the presence/absence of time errors relative to the three (3) satellites 14, and the fifth column of the H matrix identifies the presence/absence of time errors relative to the two (2) BSs 20 (or between the terrestrial time and the satellite time).

Which can then be defined, as in equation (4), as:

$$dPR = H \times dX \quad (9)$$

With an inverted H matrix providing:

$$dX = H^{-1} \times dPR \quad (10)$$

This equation (10) is iteratively calculated until the solution converges for $X_U$, $Y_U$, and $Z_U$ and the time ambiguities. One will note that a solution requires signals from at least two (2) satellites 14 and at least two (2) base stations to resolve the two different time uncertainties. Also, note that more measurements can be accommodated, i.e., matrix H does not have to be a square matrix. If matrix H is not square, then the inverse of H becomes $(H^T H)^{-1} H^T$.

The necessary processing can be accomplished at either MT 38, a BS 20, and/or other network computing resources.

In accordance with still further embodiments of the present invention, MT 38 is further configured to measure the time relationship between the GPS code phase measurement and the time of the signal feature used in the Uplink TOA, thereby relating $T_U$ and $TB_U$. Doing so, advantageously reduces the minimum number of total measurements to four (4), of which, any number can be selected from satellites 14 and/or BSs 20. In such a situation, the resulting equations will be similar to equations (3), (4), and (5).

Figure 4:
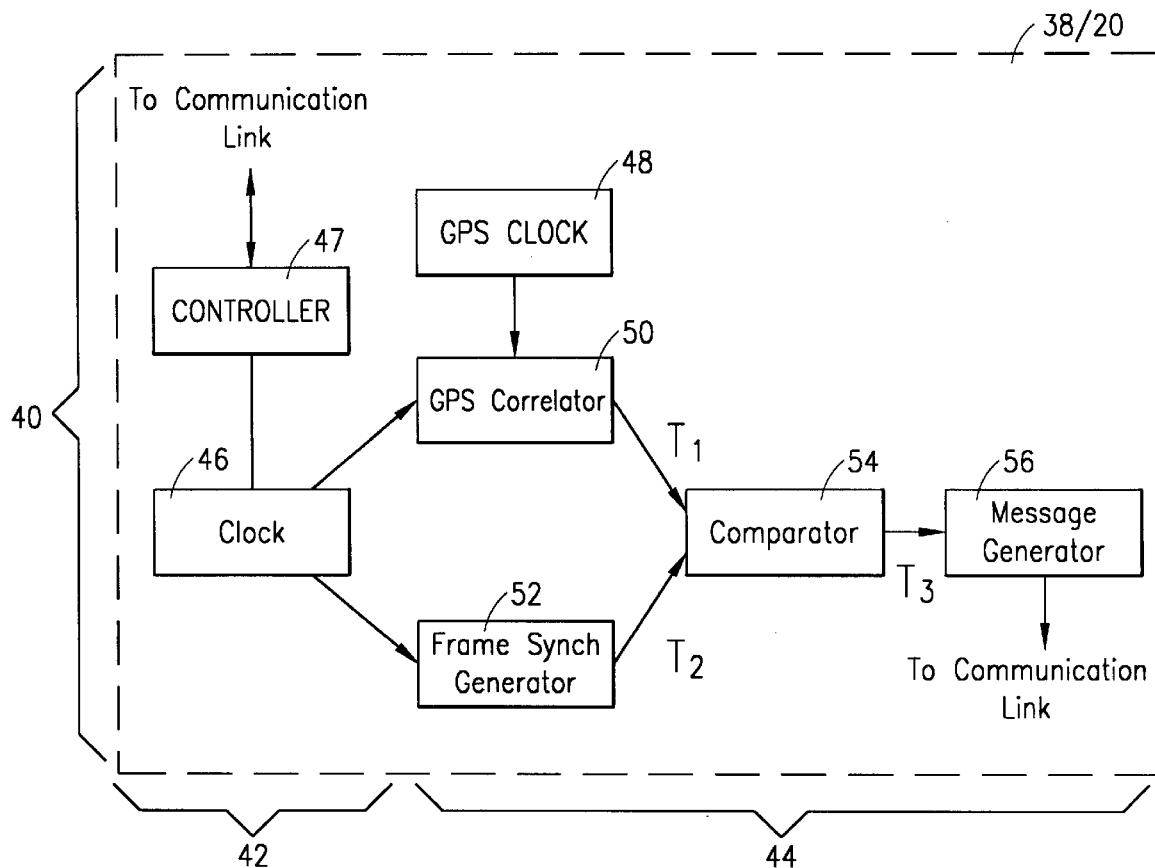
FIG. 4 is a block diagram depicting an exemplary shared clock arrangement for use in either a MT or a base station (BS) within a mobile telecommunications system, in accordance with certain embodiments of the present invention.

In accordance with certain embodiments of the present invention, one exemplary way to relate $T_U$ and $TB_U$ is by sharing a common clock between the satellite portion 44 and the terrestrial portion 42 within MT 38 (see, e.g., FIG. 4).

E. Shared Clock Arrangement Examples

As depicted in the block diagram of FIG. 4, a shared clock arrangement 40 is depicted for use in either MT 38 and/or BS 20. Shared clock arrangement 40 includes a terrestrial portion 42 and a satellite portion 44.

Terrestrial portion 42 is configured to provide signal processing relating to the conventional cellular communications capabilities of MT 38 and/or BS 20. As such, terrestrial portion 42 includes at least a local clock 46 and a cellular controller unit 47. Cellular controller unit 47 is configured to provide control/processing of cellular transmitted signals (uplink and/or downlink, as applicable) Ranging measurements associated with downlinked signals are accomplished in cellular controller unit 47 using conventional techniques when embodied within MT 38. Similarly, ranging measurements associated with uplinked signals are accomplished in cellular controller unit 47 using conventional techniques when embodied within BS 20. Clock 46 is the local internal clock of MT 14 (or a BS 20 when incorporated therein).

Satellite portion 44 includes a GPS clock 48, GPS correlator 50, a frame synch generator 52, a comparator 54 and a message generator 56.

GPS correlator 50 receives inputs from both the internal clock 46 and GPS clock 48. GPS correlator correlates the two signals and outputs a correlated clock signal (value) T1 to comparator 54. Frame synch generator 52 receives the local internal clock signal from clock 46 and outputs a corresponding frame synch signal (value) T2 to comparator 54. Comparator 54 measures the algebraic sum of the two inputted signals (values), T1 and T2, and then provides a corresponding summed output signal (value) T3 to message generator 56. Message generator 56 essentially formats the summed output signal (value) T3, or otherwise configures the information in signal (value) T3 for use within BS 20, MT 38 (e.g., for further processing as part of the locating process), or other network resources to which the information in the summed output signal (value) can be communicated to. The output from message generator 56 is provided for such purposes, for example, over a communication link (internal or external), or to cellular controller unit 47. Those skilled in the art will recognize that frame synch generator 52, which is depicted in the exemplary embodiment of FIG. 4 as being within satellite portion 44, can be included within terrestrial portion 42, instead.

As alluded to above, shared clock arrangement 40 can further be adapted to a downlink TOA, TDOA, or OTD configured MT locating system. In which case, shared clock arrangement 40 is included within BSs 20 and used to simplify the downlink-based MT locating process.

By way of example, certain conventional and proposed OTD systems include the use of one or more additional MTs, which are fixed at known locations and configured to receive downlink signals associated with the OTD's locating process from three or more BSs 20. These additional (fixed) MTs (not shown) determine when a superframe or other unique feature has been transmitted by a BS 20, and, in response, generate time corrections for each BS 20.

By using shared clock arrangement 40 in BSs 20, such additional MTs, or similarly configured devices, are not needed and can therefore be eliminated from this type of OTD system. The functionality provided by shared clock arrangement 40 allows for time information to be determined at the BS 20, for example, as in FIG. 4, by observing differences between the superframe or other unique feature and the GPS time.

Reference is now be made to certain exemplary embodiments of the present invention as employed within an OTD location system and related downlink-based locating processes.

F. Downlink TOA/TDOA/OTD Location System Examples

Figure 5:
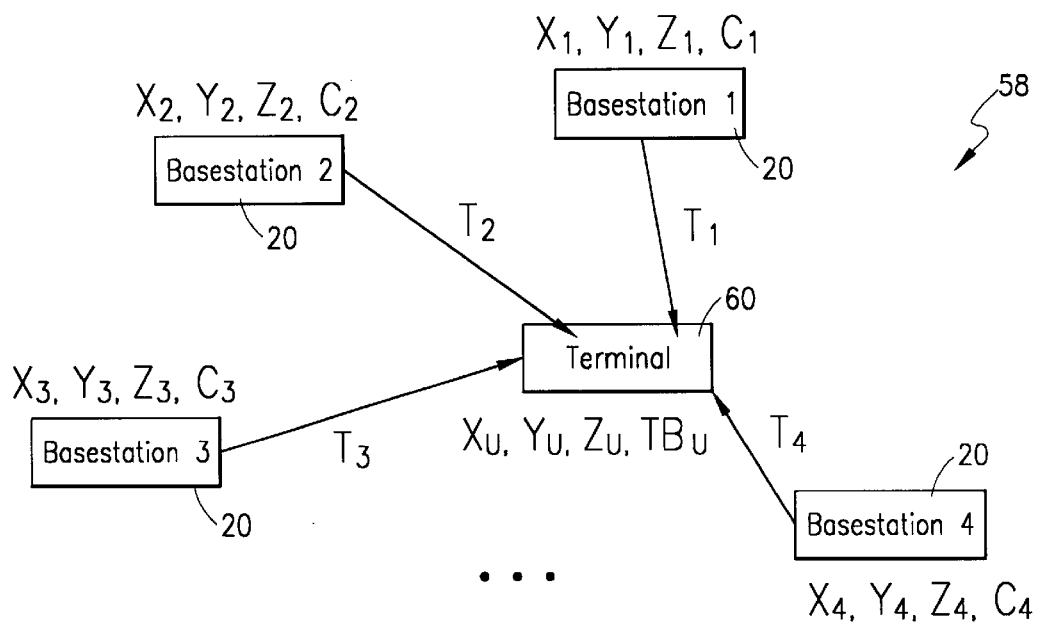
FIG. 5 is a block diagram depicting an exemplary portion of a mobile telecommunications system having a downlink TOA, time difference of arrival (TDOA), or observed time difference (OTD) MT location system for use, in place of the uplink TOA MT location system, within a mobile telecommunications system, for example, as in FIG. 2.

FIG. 5 is a block diagram, similar to FIG. 2, depicting a portion of an exemplary OTD configured mobile telecommunications system 58, in accordance with certain embodiments of the present invention.

System 58 includes MT 60 and at least four (4) BSs 20. In a typical OTD locating process, MT 60 makes ranging measurements to three (3) or more BSs 20. These ranging measurements include: 1) determining the time of arrival of a specific point in the transmission, e.g., the leading edge of the first bit of the frame synch work, for each signal relative to the local clock in MT 60; and 2) either synchronization of these points in the transmission at each BS 20 to some common clock, and/or, measurement of these points in the transmission at each BS 20, as they are transmitted, relative to a common clock, such as, e.g., GPS time. MT 60 needs to be configured to at least perform the first function (step 1 above), and to transmit the resulting ranging measurement values to one or more BSs 20 for additional processing by either BS 20 or some other network resource (e.g., see FIG. 2). Regardless of the where the additional processing is completed, the basic function is to determine the position of MT 60 by combining the received results from MT 60 with the second set of measurements (step 2 above) and the known positions of BSs 20 involved.

In accordance with certain embodiments of the present invention, instead of just making the relative range measurements (e.g., pseudorange measurements), system 58 is also configured to communicate both the synchronization data (e.g., as clock corrections) and the BSs' positional data to MT 60 for "on-board" calculation of the position of MT 60. In this manner, network 58 is similar to the satellite based location system 10 in FIG. 1, only in this case, the "satellites" (i.e., BSs) do not move with regard to time.

Moreover, as described below, even the method of finding a unique position on the transmitted signal can be made similar and used to significant advantage, per certain aspects of the present invention.

As shown in FIG. 5, the various coordinates are expressed in Earth Centered Earth Fixed reference system. $X_i$, $Y_i$, and $Z_i$ represent the known positional coordinates of the ($i^{th}$) BS 20. $X_U$, $Y_U$, and $Z_U$ represent the unknown positional coordinates of MT 60. $TB_U$ represents the time difference between BS time and MT clock time. $T_i$ represents the measured time of the unique feature in the signal transmitted by the ($i^{th}$) BS 20.

Figure 6:
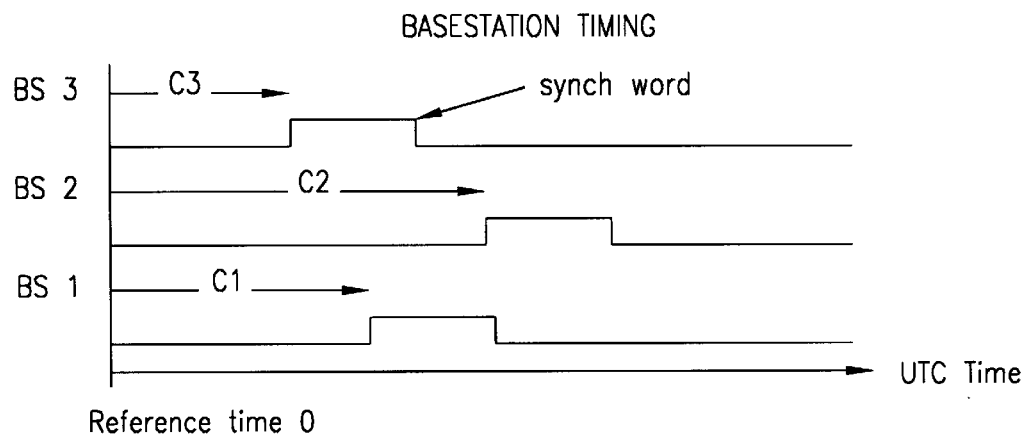
FIG. 6 is a graph depicting a time line and certain unique signal features associated with downlink transmitted signals from three different base stations, which are, for example, part of a MT location system, as in FIG. 5.

For example, as depicted in the time line graph of FIG. 6, in the case of a GSM system, an OTD method could use the twenty-six (26) bit synch word as the unique feature in the transmitted signal's waveform. Thus, each BS 20 measures the start of the synch word with respect to a common time, such as, for example, UTC or GPS time.

Figure 7:
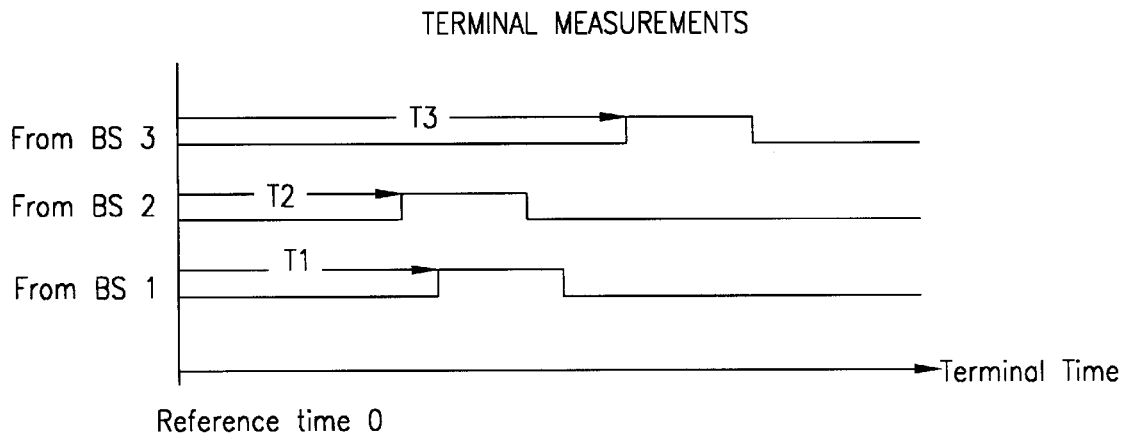
FIG. 7 is a graph depicting a time line and certain unique signal features associated with downlink transmitted signals received by a MT from three different base stations, which are, for example, part of a MT location system, as in FIG. 5.

As depicted in the time line graph of FIG. 7, then, MT 60 measures the arrival of the synch words from the different BSs using its internal clock (e.g., clock 46 in FIG. 4). Here, $T_i$ represents the TOA, with respect to the internal clock of MT 60, for each of the signals received from the ($i^{th}$) BS 20.

In the following mathematical solutions/processes associated with this exemplary OTD locating process the MT time is equal to GPS time plus $TB_U$, wherein $TB_U$ is unknown as MT 60 in this example does not have access to GPS time. The "time of flight" (TOF) from each of the ($i^{th}$) BS 20 to MT 60 is represented by $TOF_i$.

Although this is often a 2 dimensional problem with cellular systems (to first order), for the purposes of illustrating certain aspects of the present invention, the following mathematical operations include the use of four (4) BSs 20, thereby allowing for a three dimensional solution. Thus, $$PR_i = (T_i + C_i)/c \tag{11}$$

This provides essentially the same set of equations as in equations (1) through (5) associated with GPS. Thus, the MT's position is calculated, as before by:

$$PR_i = ((X_i - X_U)^2 + (Y_i - Y_U)^2 + (Z_i - Z_U)^2)^{1/2} + cTB_U \tag{12}$$

Which leads to:

$$\begin{pmatrix} PR_1 - PR'_1 \\ PR_2 - PR'_2 \\ PR_3 - PR'_3 \\ PR_4 - PR'_4 \end{pmatrix} = \tag{13}$$

$$\begin{pmatrix} (X_1 - X'_U)/R'_1 & (Y_1 - Y'_U)/R'_1 & (Z_1 - Z'_U)/R'_1 & 1 \\ (X_2 - X'_U)/R'_2 & (Y_2 - Y'_U)/R'_2 & (Z_2 - Z'_U)/R'_2 & 1 \\ (X_3 - X'_U)/R'_3 & (Y_3 - Y'_U)/R'_3 & (Z_3 - Z'_U)/R'_3 & 1 \\ (X_4 - X'_U)/R'_4 & (Y_4 - Y'_U)/R'_4 & (Z_4 - Z'_U)/R'_4 & 1 \end{pmatrix} \times \begin{pmatrix} X_U - X'_U \\ Y_U - Y'_U \\ Z_U - Z'_U \\ cT_U \end{pmatrix}$$

Which can be defined as:

$$dPR = H \times dX \quad (14)$$

With an inverted H matrix providing:

$$dX = H^{-1} \times dPR \quad (15)$$

These are then solved recursively until the solution for $X_U$, $Y_U$, and $Z_U$ and the time ambiguity is found.

F. Combined GPS and Downlink TOA/TDOA/OTD Examples

Figure 8:
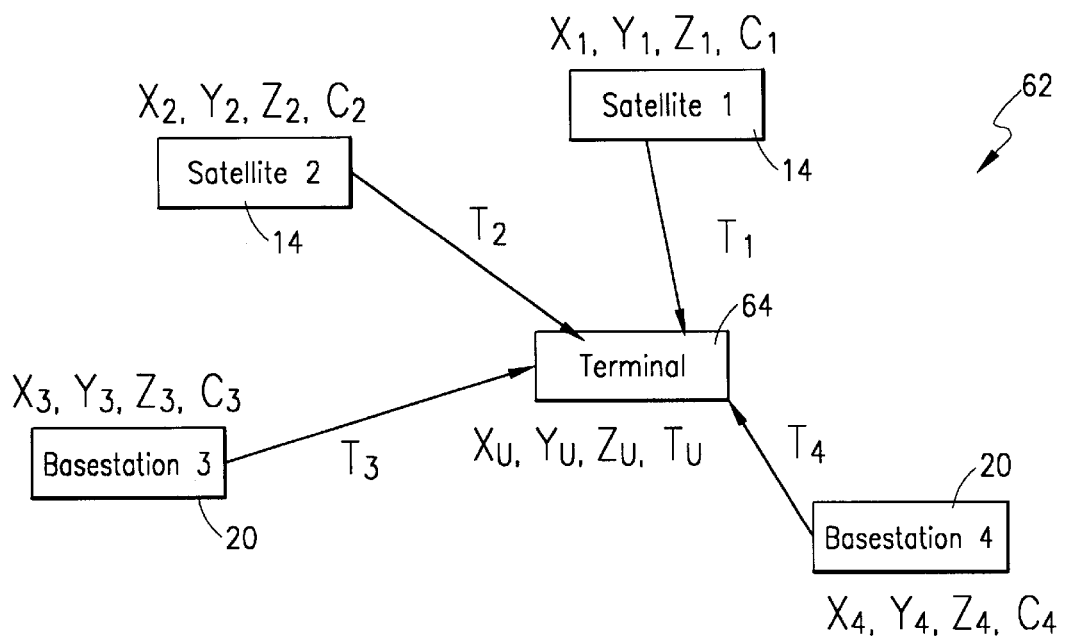
FIG. 8 is a block diagram depicting an exemplary combined GPS and downlink TOA, TDOA, or OTD MT location system for use in a mobile telecommunications system, for example, as in FIGS. 2 and 5, in accordance with certain further embodiments of the present invention.

Reference is now made to FIG. 8, which is a block diagram depicting a combined GPS and downlink TOA/OTD configured system 62, in accordance with still other embodiments of the present invention. As described in greater detail below, the signals received by MT 64 from BSs 20 are essentially treated as if transmitted from fixed GPS satellites. This allows for an efficient data fusion between the terrestrial-based and space-based MT locating techniques.

In this example, it is assumed that the GPS system is used to measure the $C_i$'s, as in the OTD case above. Furthermore, it is assumed that only a single time uncertainty relative to GPS will occur for both classes of measurements.

As shown in FIG. 8, MT 64 receives signals from two (2) satellites 14 and two (2) BSs 20, which clarify the variables involved in finding a solution. However, here, any number of satellites 14 and/or BSs 20 can be included, even down to zero (0) of either one, just so long as there are at least four (4) signals provided to MT 64. This allows for a three dimensional MT 64 positional determination.

As shown in FIG. 8, the various positional coordinates are expressed in Earth Centered Earth Fixed reference system. $X_i$, $Y_i$, and $Z_i$ represent the known positional coordinates of the ($i^{th}$) BS 20 and/or the ($i^{th}$) satellite 14. $X_U$, $Y_U$, and $Z_U$ represent the unknown positional coordinates of MT 64. $T_U$ represents the time difference between GPS time and MT clock time. $T_i$ represents the measured time of the unique feature in the signal transmitted by either the ($i^{th}$) BS 20 and/or the ($i^{th}$) satellite 14. $C_i$ represents the time correction for the ($i^{th}$) source relative to GPS time.

The pseudoranges and equations are, as before:

$$PR_i = (T_i + C_i)/c \quad (16)$$

As such, these are essentially the same set of equations as in equations (1) through (5) associated with GPS. Thus, the positional coordinates of MT 64 can be calculated by:

$$PR_i = ((X_i - X_U)^2 + (Y_i - Y_U)^2 + (Z_i - Z_U)^2)^{1/2} + cTB_U \quad (17)$$

Thus, $$\begin{pmatrix} PR_1 - PR'_1 \\ PR_2 - PR'_2 \\ PR_3 - PR'_3 \\ PR_4 - PR'_4 \end{pmatrix} = \begin{pmatrix} (X_1 - X'_U)/R'_1 & (Y_1 - Y'_U)/R'_1 & (Z_1 - Z'_U)/R'_1 & 1 \\ (X_2 - X'_U)/R'_2 & (Y_2 - Y'_U)/R'_2 & (Z_2 - Z'_U)/R'_2 & 1 \\ (X_3 - X'_U)/R'_3 & (Y_3 - Y'_U)/R'_3 & (Z_3 - Z'_U)/R'_3 & 1 \\ (X_4 - X'_U)/R'_4 & (Y_4 - Y'_U)/R'_4 & (Z_4 - Z'_U)/R'_4 & 1 \end{pmatrix} \times \begin{pmatrix} X_U - X'_U \\ Y_U - Y'_U \\ Z_U - Z'_U \\ cT_U \end{pmatrix} \quad (18)$$

Which can be defined as:

$$dPR = H \times dX \quad (19)$$

With an inverted H matrix providing:

$$dX = H^{-1} \times dPR \quad (20)$$

As before, these equations (e.g., (20)) can be solved recursively to determine a solution for $X_U$, $Y_U$, and $Z_U$ and the time ambiguity.

G. Mobile Terminal Decision Examples

An exemplary method for use in combining or fusing GPS ranging information with cellular ranging information can further include an algorithm, such as the following one, that takes advantage of the availability of GPS signals before using BS signals. This reduces the burden on the mobile telecommunications network's resources, for example.

First, MT 64 should attempt to gather ranging measurements from as many of the GPS signals that are available. Preferably, MT 64, is able to determine GPS time from the received GPS signals.

Secondly, if there not enough GPS satellite signals available, or if some are too weak or otherwise suspect, then MT 64 should supplement the GPS range measurements with BS 20 (terrestrial) ranging measurements.

Thirdly, if there are no GPS signals available, then the MT 64 should use available BS 20 ranging measurements, and use enough of them to calibrate the MT clock.

Fourthly, if BSs 20 are not synchronized to GPS time, for example, then one extra BS 20 ranging measurement will be required to calibrate the MT clock with respect to the cellular system time (e.g., see the combined GPS and uplink TOA example, above).

H. Ranging Measurement Technique Examples

Attention is now made to the measurement process involved in the various systems- described above, and in particular to certain methods and arrangements for use in MT 64, in accordance with certain embodiments of the present invention.

It is not uncommon for the signals received at the MT 64 to be weak. For example, the signal can be extremely weak (e.g., about ~0 dB carrier-to-interference (C/I) ratio). To find the unique feature, such as, a synch word, in such a signal often requires the use of a correlation function.

For example, one way to coherently detect and find the peak correlation point of the synch word (a fixed and known bit sequence 26 bits long in GSM, for example) is to use a method that is similar to that used in conventional GPS receivers. Thus, for example, a GPS receiver or signal processor can be further configured to coherently search for the 26 bit synch word in a GSM signal without having to store and then post-process the received signal samples. The resulting modified GPS receiver or signal processor can detect and find the GPS gold code and a unique feature, e.g., a synch word, in a cellular signal.

Thus, for example, a GPS receiver or signal processor can be configured to:

1.) Use a stream of signal samples, for example, obtained from an appropriate intermediate frequency (IF) module, that is equal to about 46.6 times the bit rate (e.g., about 270.83 kbps in the case of GSM). This produces a sample rate of about 37.3 times the bit rate;

2.) Decimate this sample stream by about 9.3 as a means of detection;

3.) Use the data stream multiple times (since the signal is oversampled) within a bit period to correlate it with multiple phases of the bit sequence that is being searched for. In certain cases, for example, one or more accumulators can be used to keep these multiple correlation results in real time, when the signal samples are not otherwise stored;

4.) Determine if the synch word is currently present in the signal sample stream and complete an interpolation of the maximum and adjacent correlator outputs to determine the exact phase of the synch word, for example, using a peak detector with an appropriate threshold criterion; and 5.) Combining the resulting phasing with appropriate clock data to assign a time of arrival for the first edge of the synch word (or center, if desired).

The modified GPS receiver or signal processor, in this example, simultaneously searches for the synch word in bit positions with a resolution of a fraction of a bit. In the case of GSM, for example, ten (10) physical correlators can be used to look for the 26 bit synch word. The resolution would then be about ¼ of a bit; that is, there would be four (4) phasings within a bit, which would produce a total of about 150 simultaneous correlations to occur in real time on the input signal sample stream. Because of this oversampling in bit space, additional equalization will probably not be required in such a GPS receiver or signal processor.

Such a configured or modified GPS receiver or signal processor would have the further ability to perform appropriate doppler shifts on the sampled data to remove loss that would occur if the sampling frequency was not exactly related to the signal frequency. A good starting estimate of doppler can be obtained from a strong signal transmitted from the BS 20 that MT 64 is communicating with, for example.

In the examples above, the digital processing is actually run at about 48 times the normal bit rate. For GSM, this proves to be very convenient, as 48 times the bit rate is about 13 MHZ. The IF would be converted to about 12.64 MHZ and the sample rate would be about 10.1 MHZ.

Figure 9:
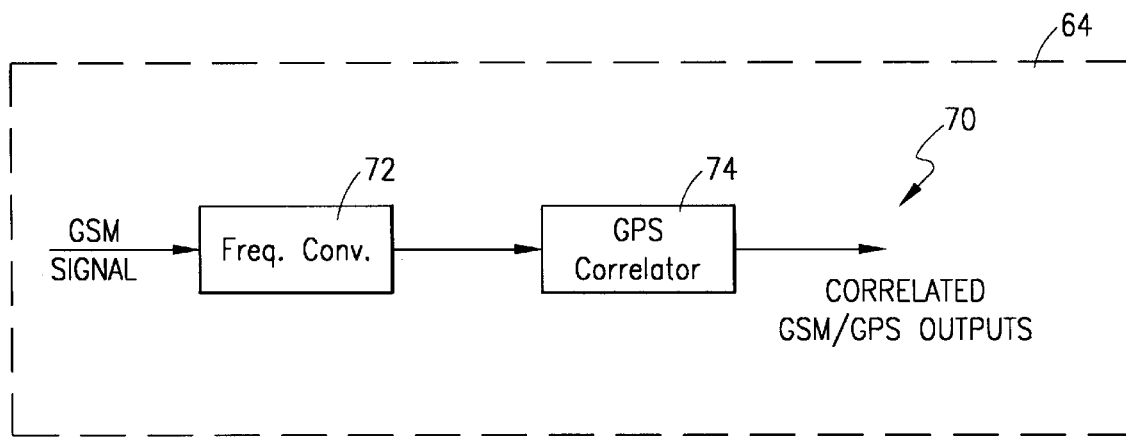
FIG. 9 is a block diagram depicting portions of an exemplary GPS configured receiver that is modified for use within a MT, in accordance with certain embodiments of the present invention, and configured to process both GPS signals and base station ranging signals associated with a combined GPS and downlink TOA, TDOA, or OTD MT location system, for example, as in FIG. 8.

To better illustrate these exemplary frequency conversions and correlation functions and associated advantages, an exemplary portion of a modified GPS receiver 70 is depicted in FIG. 9, for use in a mobile terminal, such as, MT 64. Modified GPS receiver 70 includes a frequency converter 72 that is configured to receive and down frequency convert a GSM signal and provide a corresponding down converted GSM signal to a GPS correlator 74 (for example, within a signal processor). GPS correlator 74 is configured to detect signal features from both the modified GSM signal and a conventional GPS signal, and to provide appropriate outputs.

Figure 10:
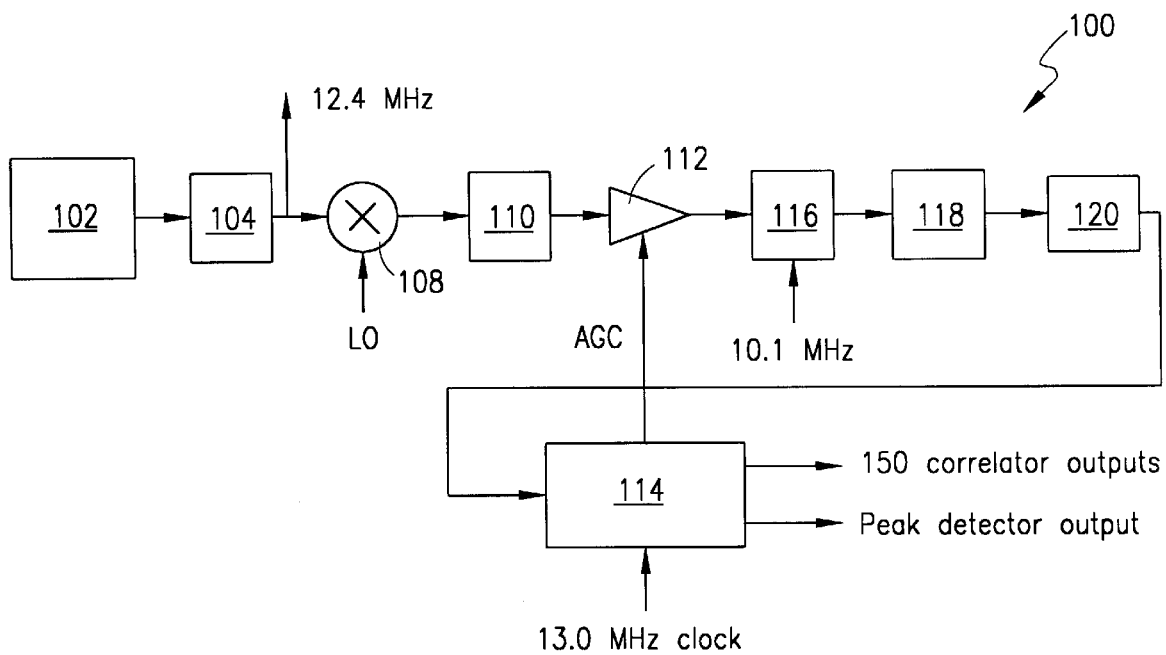
FIG. 10 is a block diagram depicting portions of an exemplary embodiment of a GPS configured receiver that is modified for use in a MT, in accordance with certain further embodiments of the present invention, and configured to process both GPS signals and base station ranging signals associated with a combined GPS and downlink TOA, TDOA, or OTD MT location system, for example, as in FIG. 8.
Figure 11:
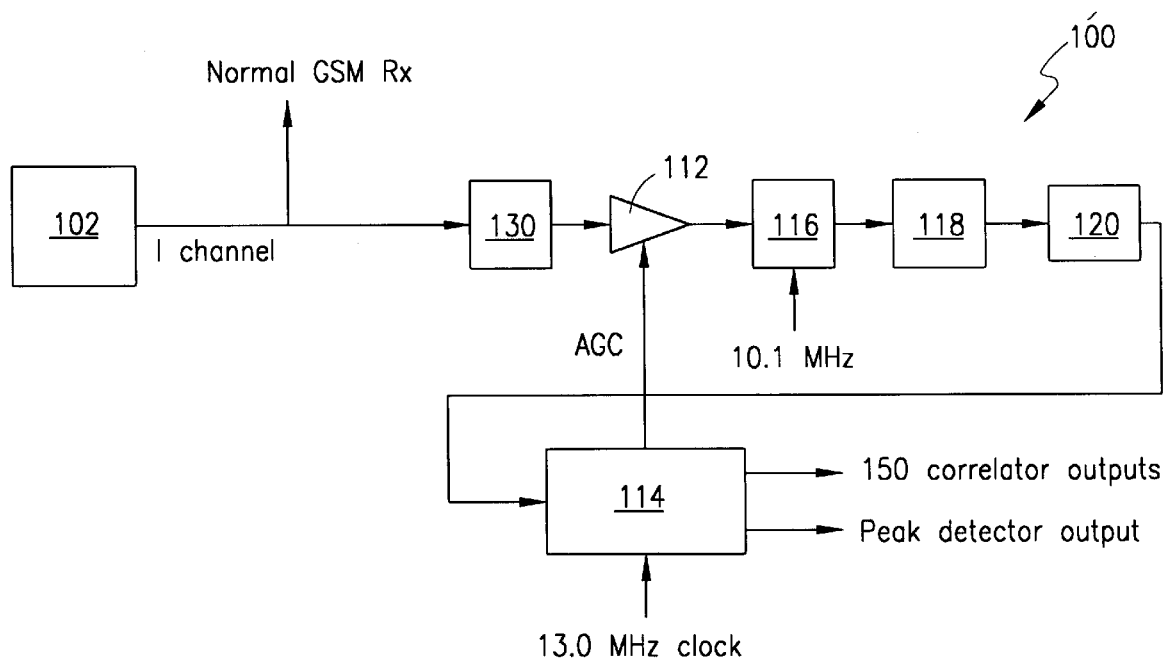
FIG. 11 is a block diagram depicting portions of yet another exemplary embodiment of a GPS configured receiver that is modified for use in a MT, in accordance with certain other embodiments of the present invention, and configured to process both GPS signals and base station ranging signals associated with a combined GPS and downlink TOA, TDOA, or OTD MT location system, for example, as in FIG. 8.

FIGS. 10 and 11 provide additional details, in the form of an exemplary modified GPS receiver 100 and an exemplary modified homodyne GPS receiver 100', respectively. Receiver 100 receives a GSM signal from a GSM front-end 102. Front-end 102 can, for example, include a conventional GSM controller unit, processor, transceiver, etc. The GSM signal is received through a SAW interference filter 104 and frequency converted (down) by multiplier 108. The resulting frequency converted signal is filtered by LC filter 110 and then sampled or quantitized using buffer 112, A/D converter 116, an FIR band pass filter (BPF) 118 to produce 2-bits in accumulator 120. The digital output from accumulator 120 is provided to a GPS baseband (BB) correlator 114 which provides correlator outputs and/or peak detector outputs. Receiver 100 preferably has a high IF. This high IF signal is preferably tapped off early in the circuitry chain, so that the GSM signal will be significantly linear going into A/D converter 116.

Because of the oversampling rate, and the reduced amount of interference resulting from SAW interference filter 104, the A/D resolution may be less in certain configurations, as determined by the C/I ratio. Further, by providing four (4) samples per bit, there is a minimal residual slow rotation in the sampled output stream (e.g., as in the GPS case with only 2 samples per chip).

Similarly, in FIG. 11, modified homodyne GPS receiver 100' receives a GSM signal from GSM front-end 102. The GSM signal is received through a low pass (LP) filter 130 and the resulting lower frequency signal is then sampled or quantitized using buffer 112, A/D converter 116, an FIR BPF 118 to produce 2-bits in accumulator 120. The digital output from accumulator 120 is provided to GPS BB correlator 114 which provides correlator outputs and/or peak detector outputs.

Figure 12:
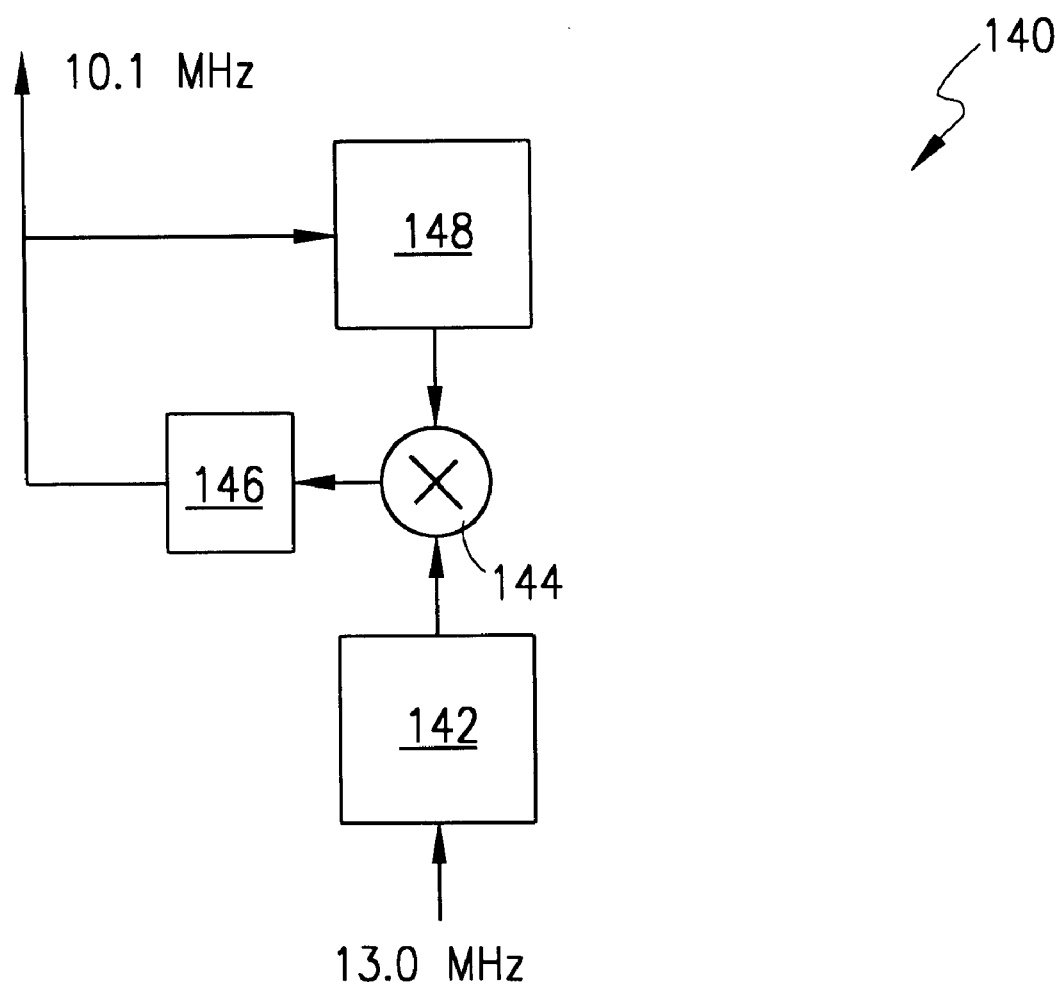
FIG. 12 is a block diagram depicting an exemplary phase locked loop arrangement that can be used in the exemplary GPS configured receivers of FIGS. 10 and 11, in accordance with certain embodiments of the present invention.

As depicted in FIG. 12, the 10.1 MHZ sampling clock provided to A/D converter 116 in FIGS. 10 and 11 can be derived from the 13.0 MHZ signal with an integer phase locked loop 140, wherein a ratio of the system clock to sample clock is 9 to 7. Thus, the exemplary integer phase locked loop 140 includes a divide by nine (9) block 142 that receives the 13.0 MHZ signal, and a divide by seven (7) block 148 in the feedback loop, each of which provide inputs to multiplier 144. The output of multiplier 144 is provided through filter 146 and then output for use, and feedback.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:

receiving at least one first type of signals from at least one satellite using a mobile terminal;

receiving at least one second type of signals from at least one terrestrial transmitter using the mobile terminal;

measuring a time of flight for each of the first type of signals;

measuring a time of flight for each of the second type of signals;

converting each of a resulting time of flight measurements associated with each of the first type of signals to a corresponding first type of range value;

converting each of a resulting time of flight measurements associated with each of the second type of signals to a corresponding second type of range value; and determining an approximate position of the mobile terminal using at least one first type of range value and at least one second type of range value.

2. The method as recited in claim 1, wherein the at least one satellite is part of a Global Positioning System (GPS).

3. The method as recited in claim 1, wherein the terrestrial transmitter is part of a mobile telecommunications system having at least one base station therein, and the second type of signal includes a downlink transmitted signal from the base station.

4. The method as recited in claim 1, wherein each of the steps of measuring the time of flight for each of the first type of signals, and measuring the time of flight for each of the second type of signals further includes using a single time measuring unit to measure the respective time of flights for both the first type of signals and the second type of signals.

5. The method as recited in claim 4, wherein the single time measuring unit is located within the mobile terminal and includes a frequency converter and a correlator.

6. An arrangement for use in a mobile terminal, the arrangement comprising a receiver for receiving at least one first type of signal associated with at least one satellite and at least one second type of signal associated with at least one terrestrial transmitter and at least one time measuring unit responsive to receive the at least one first type of signal associated with the at least one satellite and the at least one second type of signal associated with the at least one terrestrial transmitter, to measure a time of flight for each of the first type of signals and of the second type of signals, convert each of the resulting time of flight measurements to corresponding range values, determine and output an approximate position of the mobile terminal using the corresponding range values.

7. The arrangement as recited in claim 6, wherein the at least one satellite is part of a Global Positioning System (GPS).

8. The arrangement as recited in claim 6, wherein the terrestrial transmitter is part of a mobile telecommunications system having at least one base station therein, and the second type of signal includes a downlink transmitted signal from the base station.

9. A mobile telecommunications system comprising a mobile terminal having at least one time measuring unit to receive at least one first type of signal associated with at least one satellite and at least one second type of signal associated with at least one terrestrial transmitter, measure a time of flight for each of the first type of signals and each of the second type of signals, convert each of the resulting time of flight measurements to corresponding range values, determine and output an approximate position of the mobile terminal using the corresponding range values.

10. The mobile telecommunications system as recited in claim 9, wherein the at least one satellite is part of a Global Positioning System (GPS).

11. The mobile telecommunications system as recited in claim 9, further comprising at least one base station configured to communicate with the mobile terminal, and wherein the second type of signal includes a downlink transmitted signal from the base station to the mobile terminal.

12. A method comprising
receiving a plurality of first type signals from a plurality of satellites using a mobile terminal;
transmitting at least one second type of signal to a plurality of base stations using the mobile terminal;
measuring a time of flight for each of the first type of signals received at the mobile terminal;
measuring a time of flight for each of the second type of signals received at the plurality of base stations;
converting each of a resulting time of flight measurements associated with each of the first type of signals to a corresponding first type of range value;
converting each of a resulting time of flight measurements associated with each of the second type of signals to a corresponding second type of range value; and
determining an approximate position of the mobile terminal using the first type of range values and the second type of range values.

13. The method as recited in claim 12, wherein the at least one satellite is part of a Global Positioning System (GPS).

14. The method as recited in claim 12, wherein the plurality of satellites includes only two satellites and the plurality of base stations includes only two base stations, and the method further includes the step of synchronizing clocks within at least each of the two satellites and at least each of the two base stations.

15. The method as recited in claim 12, wherein the plurality of satellites includes at least two satellites and the plurality of base stations includes at least three base stations.

16. The method as recited in claim 12, wherein the plurality of satellites includes at least three satellites and the plurality of base stations includes at least two base stations.

17. The method as recited in claim 12, wherein the step of measuring the time of flight for each of the first type of signals received at the mobile terminal is accomplished by the mobile terminal.

18. The method as recited in claim 12, wherein the step of converting each of the resulting time of flight measurements associated with each of the first type of signals to a corresponding first type of range value is accomplished by the mobile terminal.

19. An arrangement for use with a mobile telecommunications system in locating a mobile terminal, the arrangement comprising a satellite location system having a plurality satellites for outputting a plurality of first type signals;

a plurality of base stations within the mobile telecommunications system;

a location determining node within the mobile telecommunications system; and a mobile station in radio communication with at least one of the plurality of base stations for transmitting at least one second type of signal to the plurality of base stations, and further for receiving the plurality of first type signals from the plurality of satellites, measuring a time of flight for each of the first type of signals, and providing a range value for each of the first type of signals received to the location determining node;

wherein the plurality of the base stations further receive the second type of signal from the mobile terminal, measure a time of flight for each of the second type of signals, and communicate a range value for each of the second type of signals received to the location determining node which is configured to determine an approximate position of the mobile terminal using the first type of range values and the second type of range values.

20. The method as recited in claim 19, wherein the at least one satellite is part of a Global Positioning System (GPS).

21. The method as recited in claim 19, wherein the plurality of satellites includes only two satellites and the plurality of base stations includes only two base stations, and the method further includes the step of synchronizing clocks within at least each of the two satellites and at least each of the two base stations.

22. The method as recited in claim 19, wherein the plurality of satellites includes at least two satellites and the plurality of base stations includes at least three base stations.

23. The method as recited in claim 19, wherein the plurality of satellites includes at least three satellites and the plurality of base stations includes at least two base stations.

24. A shared clock arrangement comprising:

a first clock outputting a first clock signal;

a second clock outputting a second clock signal;

a correlator that is connected to the first clock and the second clock for correlating the first clock signal with the second clock signal and output a correlated clock signal;

a frame generator connected to the first clock and for receiving the first clock signal and outputting a corresponding generated frame signal; and a comparator connected to the correlator and the frame generator and for measuring the algebraic sum of the correlated clock signal and the generated frame signal and outputting a corresponding summed output clock signal.

25. The shared clock arrangement as recited in claim 24, further comprising:

a message generator connected to the comparator for formatting the summed output clock signal for use with at least one mobile telecommunications network resource selected from a group comprising a mobile terminal and a base station.

26. The shared clock arrangement as recited in claim 24, wherein the second clock signal is a Global Positioning System (GPS) clock signal.

* * * * *